(12) United States Patent
Chen et al.

(10) Patent No.: US 11,080,860 B2
(45) Date of Patent: Aug. 3, 2021

(54) IMAGE INSPECTION METHOD

(71) Applicant: CHROMA ATE INC., Tao-Yuan (TW)

(72) Inventors: Ting-Wei Chen, Tao-Yuan (TW);
Yu-Hsin Liu, Tao-Yuan (TW);
Ming-Kai Hsueh, Tao-Yuan (TW)

(73) Assignee: CHROMA ATE INC., Tao-Yuan (TW)

( * ) Notice: Subject to any disclaimer, the term of this patent is extended or adjusted under 35 U.S.C. 154(b) by 11 days.

(21) Appl. No.: 16/693,360

(22) Filed: Nov. 24, 2019

(65) Prior Publication Data

US 2020/0211199 A1   Jul. 2, 2020

(30) Foreign Application Priority Data

Dec. 28, 2018 (TW) ................................ 107147861

(51) Int. Cl.
*G06T 7/174* (2017.01)
*G06T 7/90* (2017.01)
*G06T 7/11* (2017.01)
*G06T 7/00* (2017.01)

(52) U.S. Cl.
CPC ............ *G06T 7/174* (2017.01); *G06T 7/0002* (2013.01); *G06T 7/11* (2017.01); *G06T 7/90* (2017.01)

(58) Field of Classification Search
CPC combination set(s) only.
See application file for complete search history.

(56) References Cited

U.S. PATENT DOCUMENTS

| 5,097,492 A | 3/1992 | Baker et al. |
| 5,097,516 A | 3/1992 | Amir |
| 6,396,949 B1 | 5/2002 | Nichani |
| 2009/0230303 A1* | 9/2009 | Teshima ................. H01J 37/302 250/310 |
| 2014/0064636 A1* | 3/2014 | Zhang ..................... G06T 5/002 382/284 |
| 2017/0309021 A1* | 10/2017 | Barnes ................... G06T 7/0012 |
| 2019/0096057 A1* | 3/2019 | Allen .................... G06T 7/0008 |

FOREIGN PATENT DOCUMENTS

| CN | 103258206 A | 8/2013 |
| CN | 104392432 A | 3/2015 |
| CN | 103872983 B | 5/2016 |
| CN | 107014819 A | 8/2017 |
| CN | 107578409 A | 1/2018 |
| CN | 107274393 B | 3/2018 |
| TW | I574003 B | 3/2017 |
| TW | I644098 B | 12/2018 |

OTHER PUBLICATIONS

Xian Tao , "Wire Defect Recognition of Spring-Wire Socket Using Multitask Convolutional Neural Networks", IEEE Transactions on Components, Packaging and Manufacturing Technology, vol. 8, No. 4, Apr. 2018,Jun. 2, 2018, pp. 690-696.*

* cited by examiner

*Primary Examiner* — Omar S Ismail
(74) *Attorney, Agent, or Firm* — CKC & Partners Co., LLC

(57) ABSTRACT

An image inspection method includes capturing a target object image, which the target object image comprises a plurality of graphical features; choosing a block image comprising a specific graphical feature of the plurality of graphical features from the target object image; capturing all the graphical features of the block image to obtain a region of interest (ROI); executing a filtering process or a recovering process on the ROI to obtain a pre-processed region; and inspecting, according to the pre-processed region, the target object image to determine whether the target object image has defects.

10 Claims, 13 Drawing Sheets

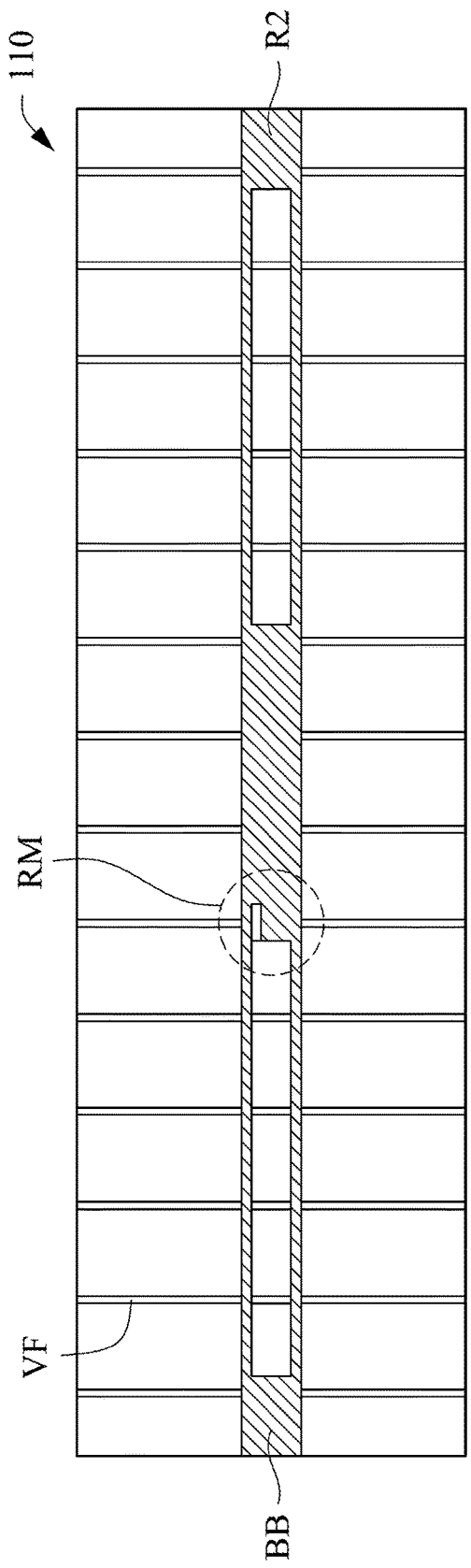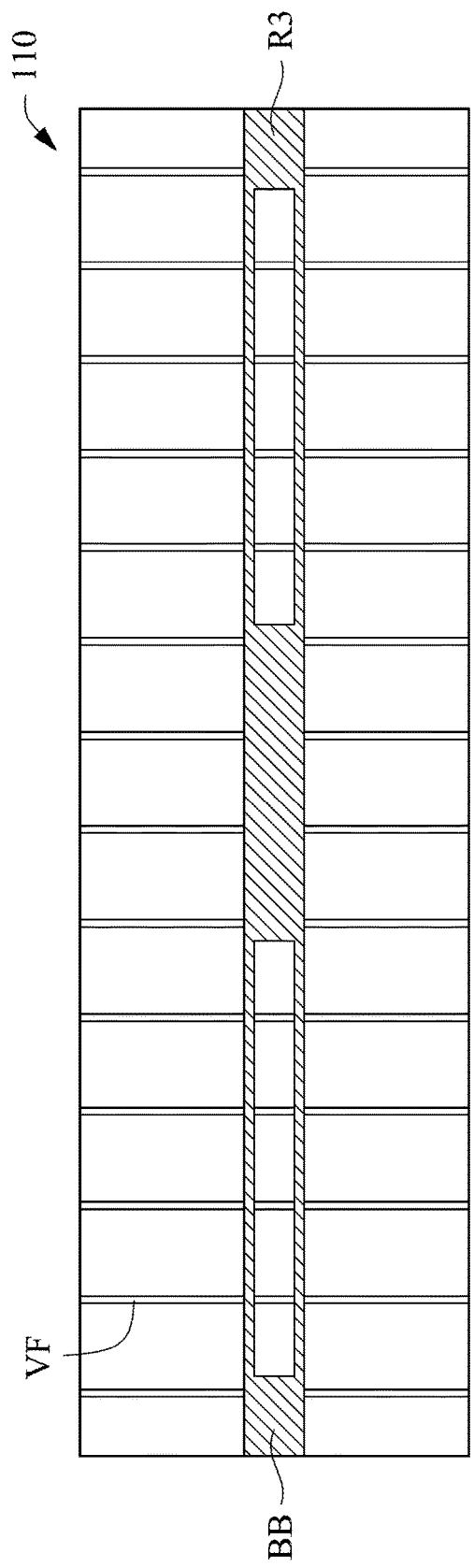

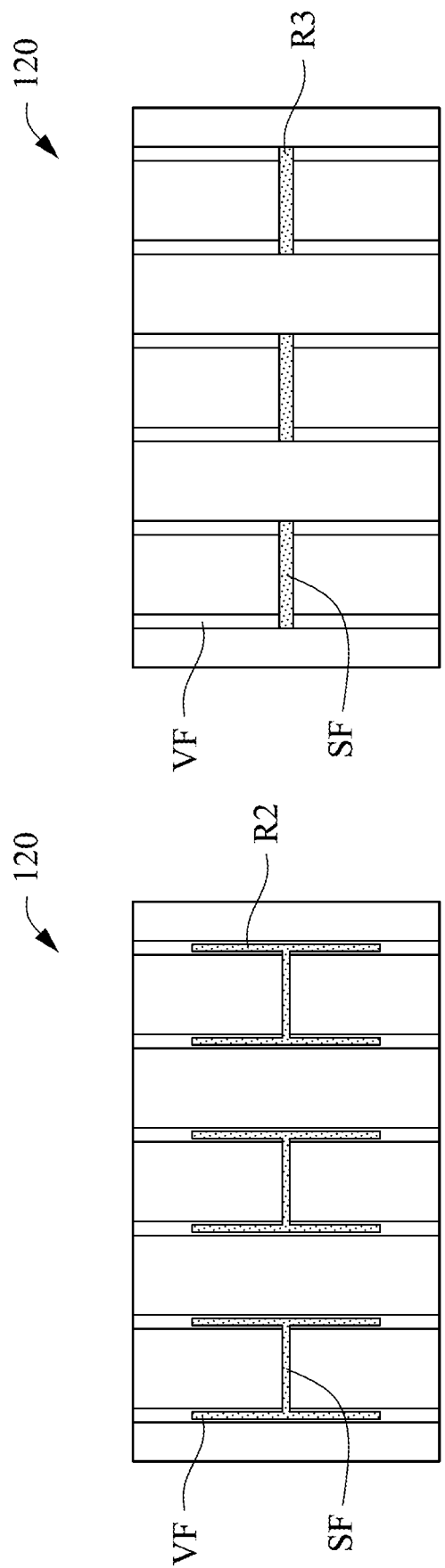

IMAGE INSPECTION METHOD

CROSS-REFERENCE TO RELATED APPLICATION

This application claims priority to and the benefit of Taiwan Application Serial Number 107147861, filed on Dec. 28, 2018, the entire content of which is incorporated herein by reference as if fully set forth below in its entirety and for all applicable purposes.

BACKGROUND

Field of Disclosure

The disclosure generally relates to an inspection method, and more particularly, to an image inspection method.

Description of Related Art

The existing optical inspection technology requires the design of different image processing algorithms for the detection respectively of different patterns or shapes. Therefore, much time must be expended to develop a new image processing algorithm each time a new pattern or shape is encountered.

On the other hand, while an image processing algorithm can inspect many patterns or shapes in the optical inspection procedure, it may not meet inspection requirements. Therefore, each time a different inspection requirement is encountered, it is necessary to expend time to modify the image processing algorithm in order to that the requirements are satisfied. Therefore, how to improve the operating processes for optical inspections is an important problem to be solved.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect directed towards an image inspection method is disclosed. The image inspection method includes capturing a target object image, wherein the target object image comprises a plurality of graphical features; choosing a block image comprising a specific graphical feature of the plurality of graphical features from the target object image; capturing all the graphical features of the block image to obtain a region of interest (ROI); executing a filtering process or a recovering process on the ROI to obtain a pre-processed region; and inspecting, according to the pre-processed region, the target object image to determine whether the target object image has defects.

It is to be understood that both the foregoing general description and the following detailed description are by examples, and are intended to provide further explanation of the disclosure as claimed.

BRIEF DESCRIPTION OF THE DRAWINGS

FIG. 4C is a schematic illustration of an intermediate region generated by executing a filtering process on the ROI of FIG. 4B.

FIG. 4D is a schematic illustration of a pre-processed region generated by executing a recovering process on the intermediate region of FIG. 4C.

FIG. 5C is a schematic illustration of an intermediate region generated by executing the recovering process on the ROI of FIG. 5B.

FIG. 5D is a schematic illustration of a pre-processed region generated by executing the filtering process on the intermediate region of FIG. 5C.

DETAILED DESCRIPTION

Figure 1A:
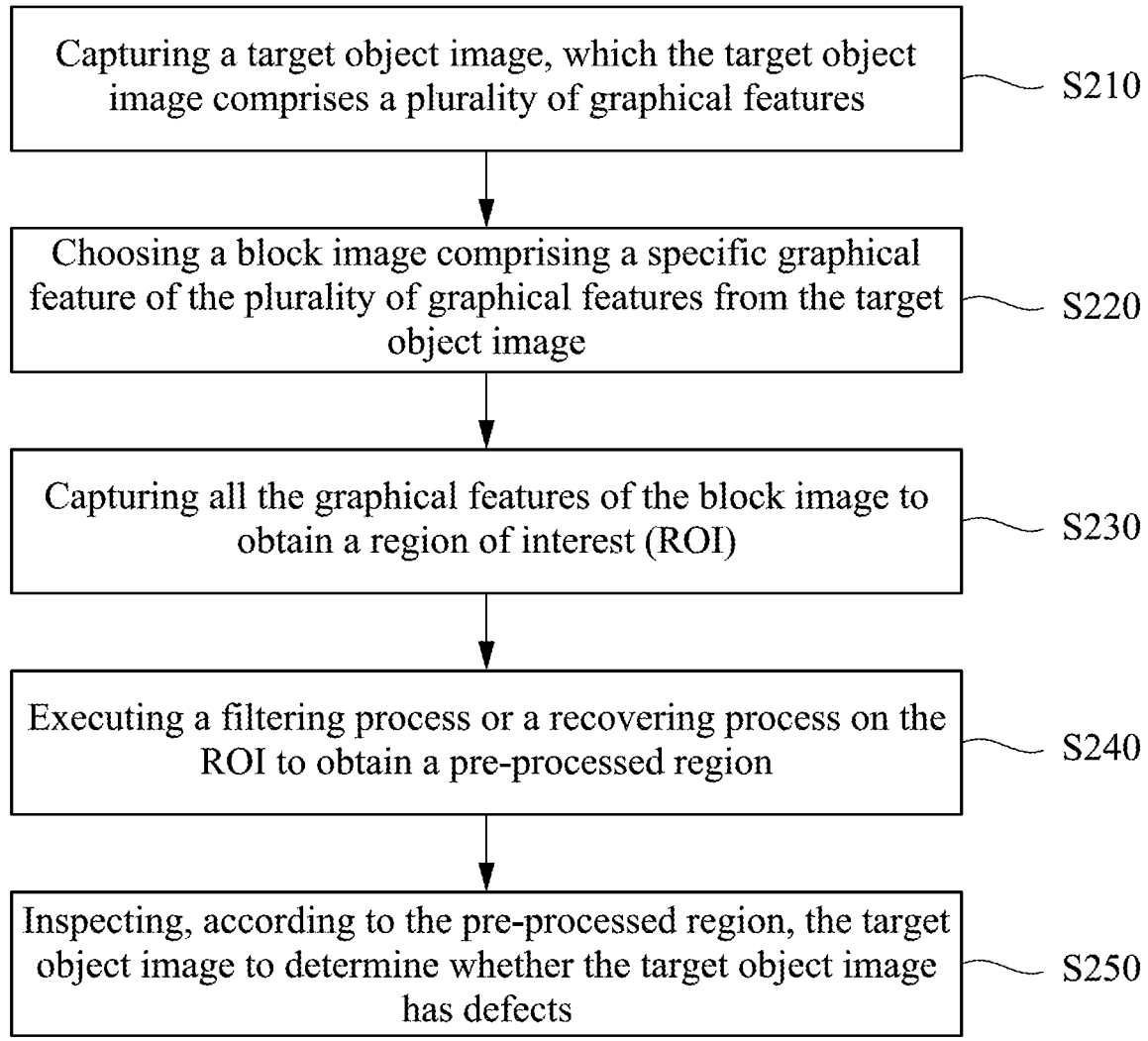
FIGS. 1A-1C are flow charts illustrating exemplary processes for an image inspection method in accordance with some aspects of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 1B:
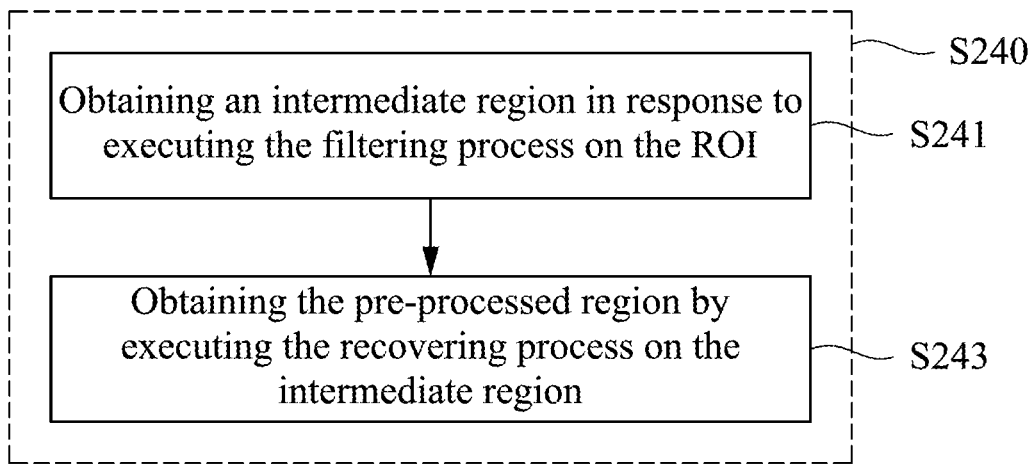
Figure 1C:
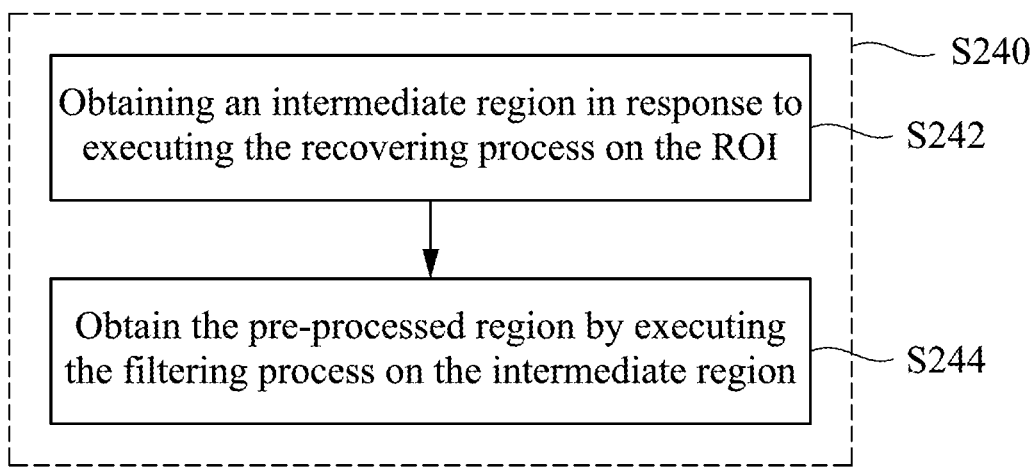

Reference is made to FIG. 1A to FIG. 1C, which are flow charts illustrating exemplary processes for an image inspection method in accordance with some aspects of the present disclosure.

Figure 2:
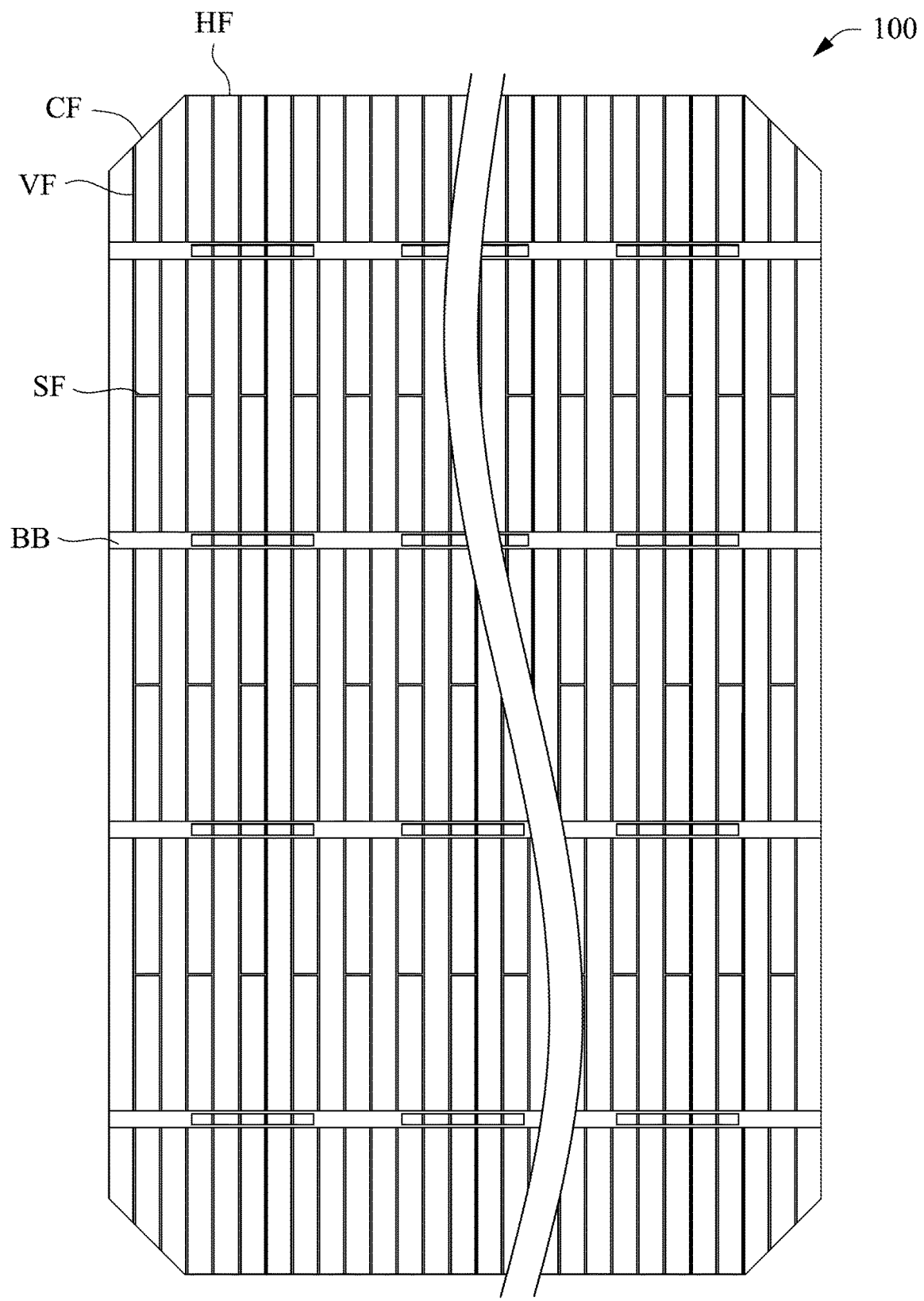
FIG. 2 is a schematic illustration of a target object image in accordance with some aspects of the present disclosure.

In step S210, a target object image 100 is captured, which the target object image 100 comprises a plurality of graphical features. Additional reference is made to FIG. 2, which is a schematic illustration of the target object image 100 in accordance with some aspects of the present disclosure.

In some embodiments, an image acquiring device (not shown) (such as a complementary metal oxide semiconductor (CMOS) image sensor, a charge coupled device (CCD) image sensor, and so on) captures images of a target object, to obtain the target object image 100. The target object is the object to be inspected to determine whether the target object has defects. The target object can be, but is not limited to, a solar panel, a circuit board, or another object to be inspected. In some embodiments of the present disclosure, the target object is taken as an example to be a solar panel, and it should not be limited herein.

The target object image 100 includes a plurality of electric wire patterns, and the electric wire patterns have their corresponding graphical features. For example, the electric wire patterns of the target object image 100 includes a busbar (BB), a horizontal finger (HF), a chamfer (CF), a vertical finger (VF), and a short finger (SF). The graphical features of the busbar BB are the patterns having a specific width and solid coatings, and there is a space between the solid coatings of the patterns. The graphical features of the horizontal finger HF are the patterns having horizontal-strip lines. The graphical features of the chamfer CF are the oblique-thin lines at corners of the image. The graphical features of the vertical finger VF are the patterns having the vertical long-thin lines. The graphical features of the short finger SF are the patterns having the horizontal short-thin lines.

It should be noted that the foresaid electric wire patterns and the graphical features corresponding to the electric wire patterns are taken as examples for illustration, and a person of ordinary skill in the art will understand that different patterns can be designed for practical situations in order to implement the image inspection method.

Figure 3:
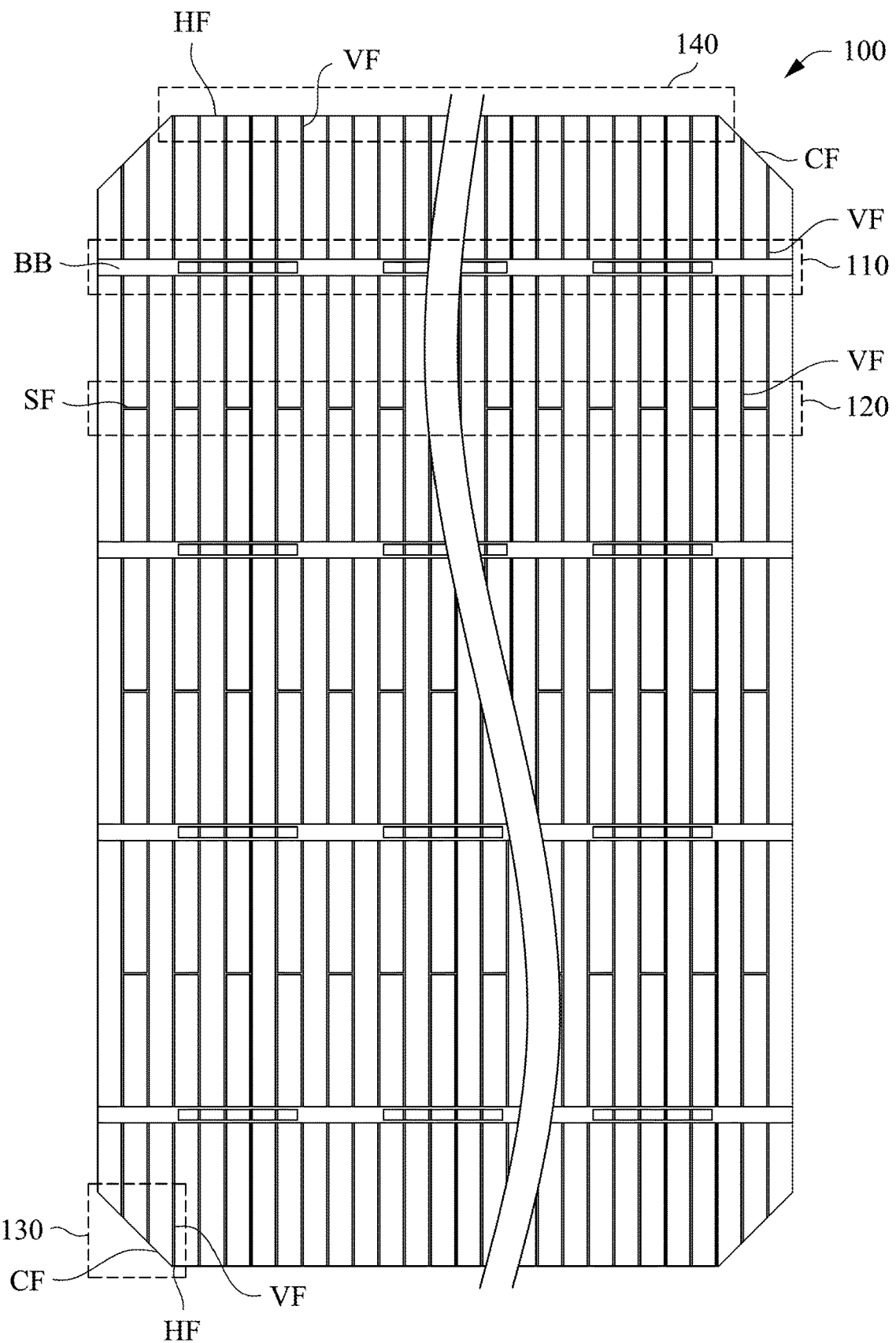
FIG. 3 is a schematic illustration of a plurality of block images of the target object image in accordance with some aspects of the present disclosure.

In step S220, a block image, comprising a specific graphical feature of the plurality of graphical features, is chosen from the target object image 100. Additional reference is made to FIG. 3, which is a schematic illustration of a plurality of block images of the target object image 100 in accordance with some aspects of the present disclosure.

In some embodiments, the graphical features include the features of the busbar BB, the horizontal finger HF, the chamfer CF, the vertical finger VF, and the short finger SF. The foresaid graphical features include one or more of the busbar BB, the horizontal finger HF, the chamfer CF, the vertical finger VF, and the short finger SF.

For example, when the electric wire patterns to be inspected of the target object image 100 is the busbar BB, the specific graphical features are the graphical features of the busbar BB which are the specific width and the solid coatings, and there is the space between the solid coatings of the patterns, as stated above. Accordingly, the busbar block image 110 including the specific graphical features (i.e., the graphical features of the busbar BB) is chosen from the target object image 100. Furthermore, the shape of selection frame for the block image 100 is a rectangle, such that the other graphical features will be enveloped (partially) in the selection frame while choosing the busbar block image 110 from the target object image 100. As a result, the busbar block image 110 includes not only the graphical features of the busbar BB but also the graphical features of the vertical finger VF.

In another embodiment, when the electric wire patterns to be inspected of the target object image 100 are the graphical features of the short finger SF, the specific graphical features are the graphical features of the short finger SF which are horizontal short-thin lines, as sated above. Accordingly, the short finger block image 120 including the specific graphical features (i.e., the graphical features of the short finger SF) is chosen from the target object image 100. Furthermore, the short finger block image 120 includes not only the graphical features of the short finger SF but also the graphical features of the vertical finger VF.

Similarly, the chamfer block image 130 and the horizontal finger block image 140 are also chosen according to the procedure described above. The chamfer block image 130 includes not only the graphical features of the chamfer CF, but also the graphical features of the vertical finger VF and the horizontal finger HF. The horizontal finger block image 140 includes not only the graphical features of the horizontal finger HF, but also the graphical features of the vertical finger VF and the chamfer CF.

To simplify the explanation to follow by avoiding repetition of descriptions related to similar concepts in the present disclosure, the busbar block image 110 and the short finger block image 120 are taken as examples for illustration hereinafter.

In step S230, all the graphical features of the block image are captured to obtain a region of interest (ROI).

Figure 4A:
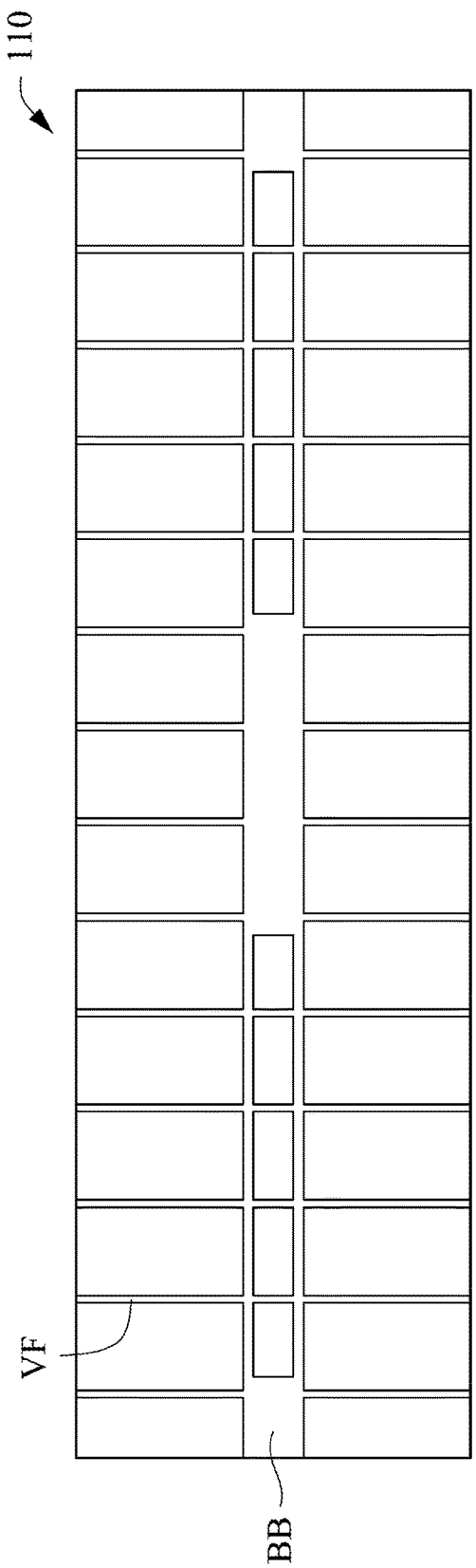
FIG. 4A is a schematic illustration of a busbar block image of the target object image in accordance with some aspects of the present disclosure.
Figure 4B:
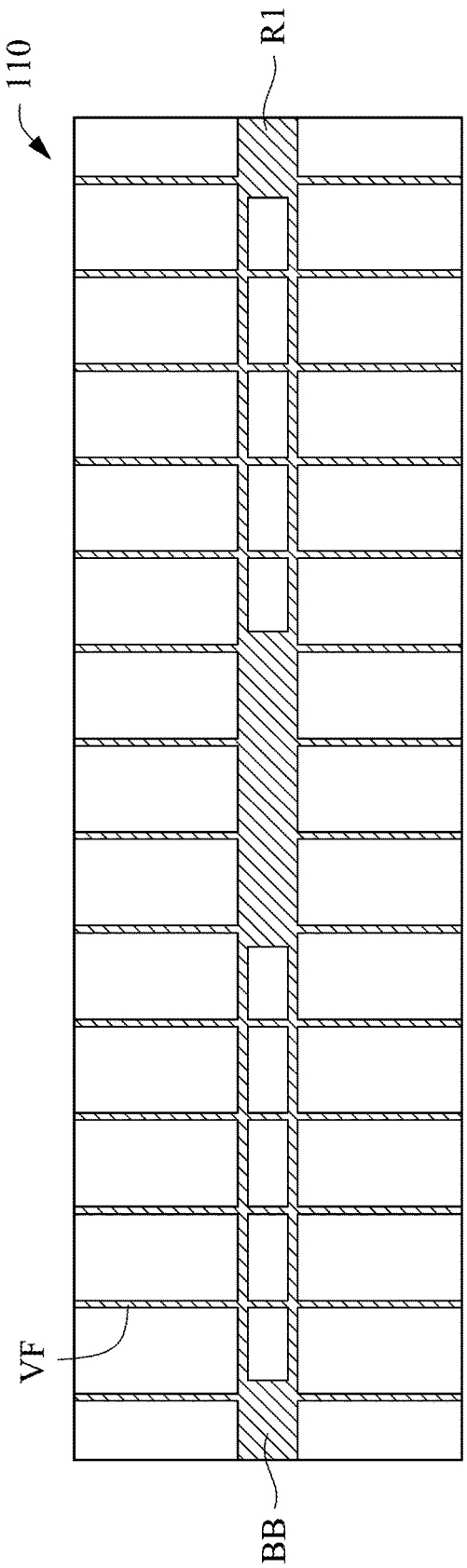
FIG. 4B is a schematic illustration of a region of interest (ROI) of the busbar block image of FIG. 4A.

In some embodiments, the busbar block image 110 is taken as an example. Reference is made to FIG. 4A and FIG. 4B. FIG. 4A is a schematic illustration of a busbar block image 110 of the target object image 100 in accordance with some aspects of the present disclosure. FIG. 4B is a schematic illustration of an ROI of the busbar block image 110 of FIG. 4A. As shown in FIG. 4A, the busbar block image 110 includes the graphical features of the busbar BB and the vertical finger VF. As shown in FIG. 4B, the graphical features of the busbar BB and the vertical finger VF can be acquired by executing an image processing algorithm on the busbar block image 110, in order to obtain an ROI R1.

In step S240, a filtering process or a recovering process is executed on the ROI, in order to obtain a pre-processed region. Furthermore, step S240 further comprises step S241 and step S243 of FIG. 1B, or comprises step S242 and step S244 of FIG. 1C. Step S241 and step S243 of FIG. 1B and step S242 and step S244 of FIG. 1C can be picked according to types of the block images and the requirements of the actual situations.

The busbar block image 110 is taken as an example, which is suitable for executing step S241 and step S243 of FIG. 1B. Additional reference is made to FIG. 4B to FIG. 4D. FIG. 4C is a schematic illustration of an intermediate region generated by executing a filtering process on the ROI of FIG. 4B. FIG. 4D is a schematic illustration of a pre-processed region generated by executing a recovering process on the intermediate region of FIG. 4C.

In step S241, the intermediate region is obtained in response to executing the filtering process on the ROI. The ROI R1 of FIG. 4B includes the graphical features of the busbar BB and the vertical finger VF. As is evident from the above, the electric wire patterns to be inspected of the target object image 100 is the busbar BB. In other words, the graphical features of the busbar BB in the ROI R1 should be retained, and the graphical features of the vertical finger VF should be removed. This can be achieved by executing the filtering process on the ROI R1 to filter the graphical features of the vertical finger VF, which do not belong to the graphical features of the busbar BB, such that the intermediate region R2 of FIG. 4C can be obtained. Details of the filtering process will be described hereinafter.

In step S243, the pre-processed region is obtained by executing the recovering process on the intermediate region. There is an error region RM of the intermediate region R2 in FIG. 4C, such that the graphical features of the busbar BB are not retrieved entirely. The reason for the cause of the error region RM may be related to limitations of the filtering process or flaws of the busbar BB, however, this will be not discussed herein. Furthermore, the recovering process is executed on the intermediate region R2 such that the error region RM is eliminated from the intermediate region R2, in order to obtain the pre-processed region R3 as shown in FIG. 4D. A description of details related to the recovering process will be provided hereinafter.

In step S250, the target object image is inspected according to the pre-processed region to determine whether the target object image has defects. Referring to both FIG. 4A and FIG. 4D, the pre-processed region R3 shown in FIG. 4D is an inspection sample of the graphical features of the busbar BB shown in FIG. 4A. Therefore, a determination of whether the graphical features of the busbar BB have defects can be made through the process of detecting the pre-processed region R3. For example, by superimposing the pre-processed region R3 on the graphical features of the busbar BB, the range of inspection can be scaled down to the graphical features of the busbar BB only, and furthermore, an algorithm for the express purpose of inspecting defects of the busbar BB is executed to determine whether the pixel gray values of the graphical features of the busbar BB are consistent with default values. If the pixel gray values of the graphical features of the busbar BB are consistent with default values, there are no detects on the busbar BB. However, if the pixel gray values of the graphical features of the busbar BB are not consistent with default values, there are detects on the busbar BB. It should be noted that the foresaid process of determining whether the graphical features of the busbar BB have defects is only an exemplary embodiment which should not be limited herein. Moreover, the process of detecting the consistency between the pixel gray values of the graphical features of the busbar BB and the default values is not described in detail because it is not the main feature of the present disclosure.

Figure 5A:
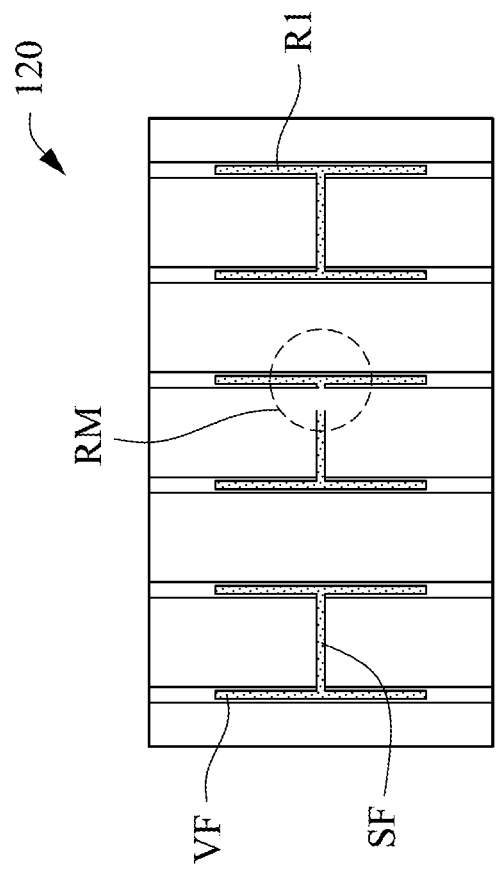
FIG. 5A is a schematic illustration of a short finger block image of the target object image in accordance with some aspects of the present disclosure.
Figure 5B:
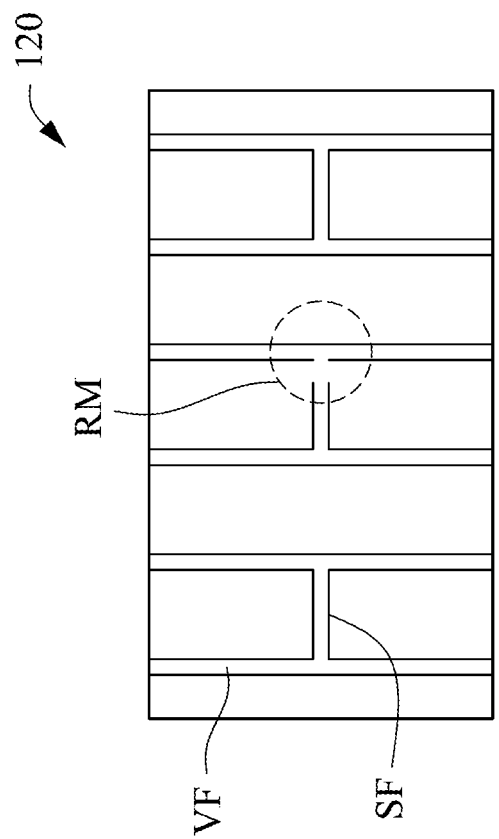
FIG. 5B is a schematic illustration of an ROI of the short finger block image of FIG. 5A.

Furthermore, taking the short finger block image 120 as an example, the process of detecting the short finger block image 120 should be step S242 and step S244 of FIG. 1C. Reference is made to FIG. 5A to FIG. 5D. FIG. 5A is a schematic illustration of a short finger block image 120 of the target object image 100 of FIG. 3 in accordance with some aspects of the present disclosure. FIG. 5B is a schematic illustration of an ROI of the short finger block image 120 of FIG. 5A. FIG. 5C is a schematic illustration of an intermediate region generated by executing the recovering process on the ROI of FIG. 5B. FIG. 5D is a schematic illustration of a pre-processed region generated by executing a filtering process on the intermediate region of FIG. 5D. As shown in FIG. 5A, the short finger block image 120 includes graphical features of the short finger SF and the vertical finger VF, which the short finger SF has the lines which are disconnected partially as the error region RM. As shown in FIG. 5B, the ROI R1 is obtained by executing the image processing algorithm to capture the graphical features of the short finger SF and the vertical finger VF of the short finger block image 120.

In step S242, the intermediate region is obtained in response to selecting and executing the filtering process in the ROI. Because disconnection of the lines of the short finger SF form the error region RM, execution of the recovering process involves recovering the partially disconnected lines of the short finger SF, such that the error region RM is eliminated from the ROI R1 as the intermediate region R2 of FIG. 5C. A description of the details of the recovering process will provided hereinafter.

In step S244, the pre-processed region is obtained by executing the recovering process on the intermediate region.

As shown in FIG. 5C, the intermediate region R2 includes the graphical features of the short finger SF and the vertical finger VF. The electric wire patterns to be inspected of the target object image 100 is the short finger SF, that is, the graphical features of the short finger SF in the ROI R1 should be retained, and the graphical features of the vertical finger VF should be eliminated. Accordingly, the graphical features of the vertical finger VF, which do not belong to the graphical features of the short finger SF, can be eliminated from the graphical features of the short finger SF by executing the filtering process on the intermediate region R2 as the pre-processed region R3 of FIG. 5D. Details of the filtering process will be described hereinafter.

It should be noted that the suitable usage situations and the execution order of the foresaid recovering process and the filtering process have been described as embodiments and are not limited herein. The recovering process and the filtering process can be selected to apply the image inspection method according to the types of the block image and the actual requirements.

The filtering process and the recovering process will now be described.

Figure 6A:
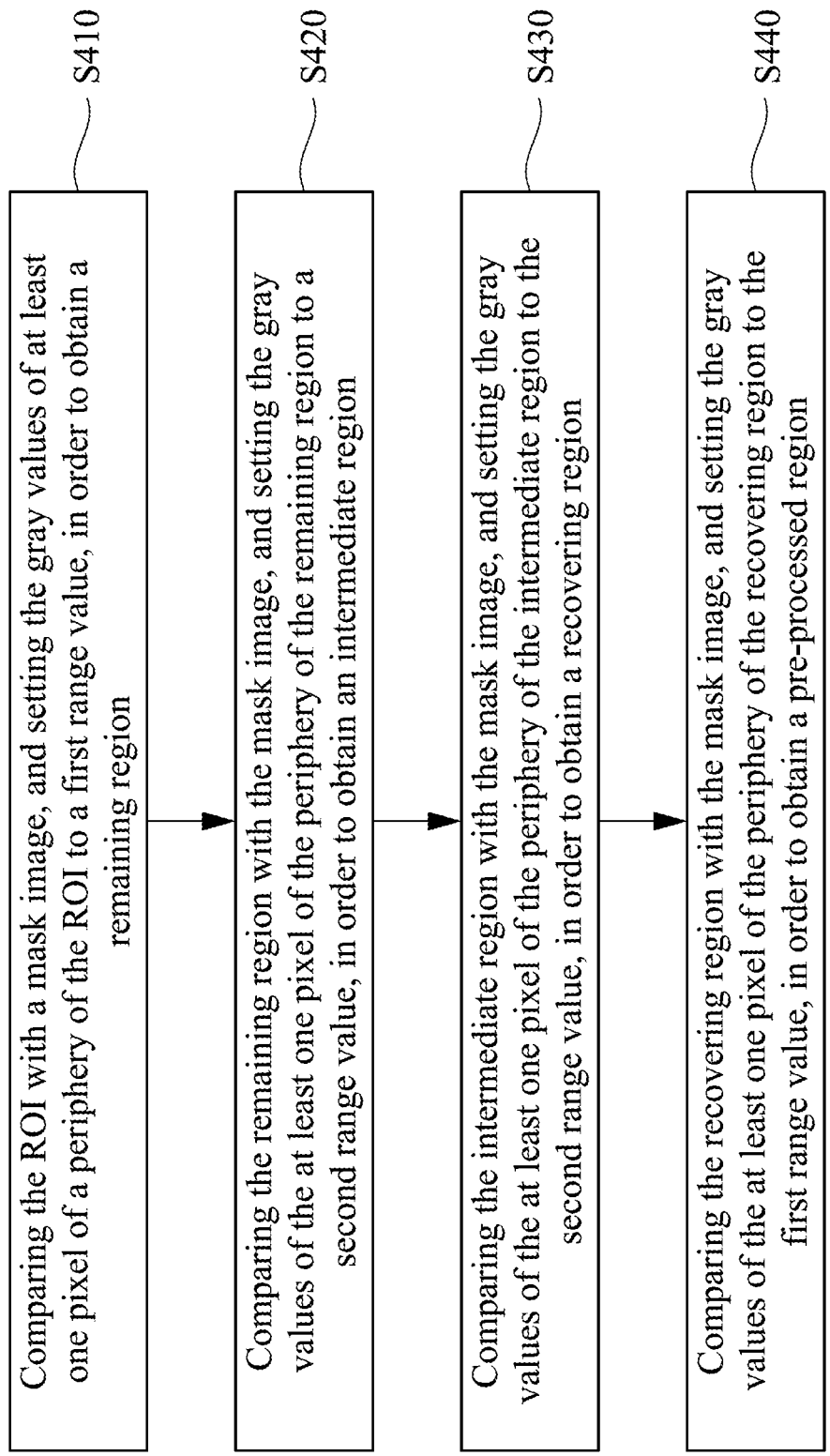
FIG. 6A is a flow chart illustrating an exemplary process for the filtering process and the recovering process in accordance with some aspects of the present disclosure.

Reference is made to FIG. 6A, which is a flow chart illustrating an exemplary process for the filtering process and the recovering process in accordance with some aspects of the present disclosure. As shown in FIG. 6A, steps S410~S420 are related to the filtering process, and steps S430~S440 are related to the recovering process.

In step S410, the ROI is compared with a mask image and the gray values of at least one pixel of a periphery of the ROI is set, according to gray values of pixels indicated in the mask image, to a first range value, in order to obtain a remaining region.

Figure 7:
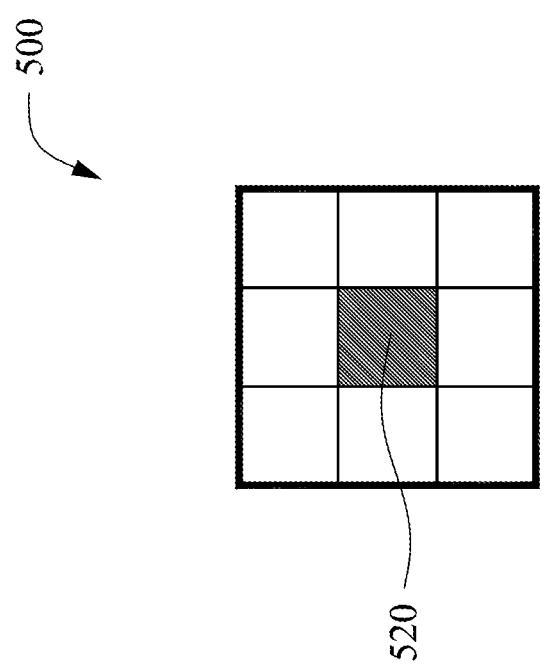
FIG. 7 is a schematic illustration of a mask in accordance with some aspects of the present disclosure.

Reference is made to FIG. 7, which is a schematic illustration of a mask 500 in accordance with some aspects of the present disclosure. In some embodiments, the mask image 500 is a 3×3-square image, and each square image is 30 pixels×30 pixels (yet in another embodiment each square is a rectangle image, such as 20 pixels×30 pixels). The mask image 500 includes a retained region 520.

Figure 8B:
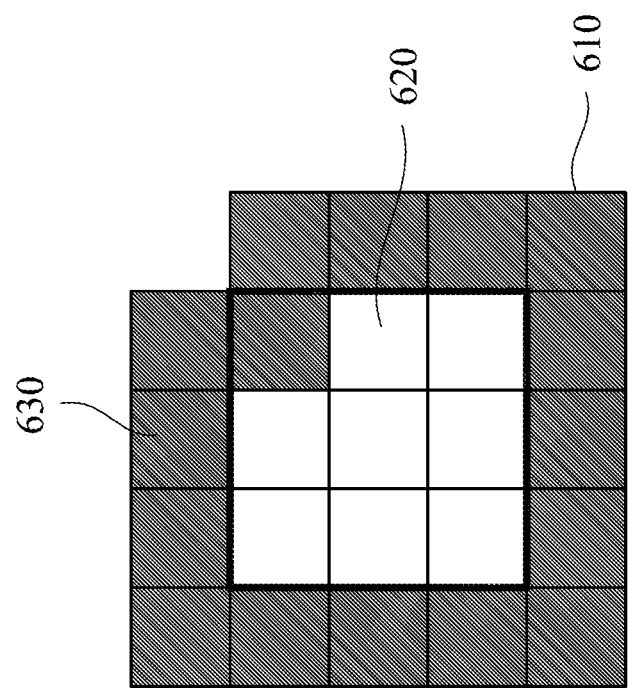
FIG. 8B is a schematic illustration of a remaining region in accordance with some aspects of the present disclosure.
Figure 8A:
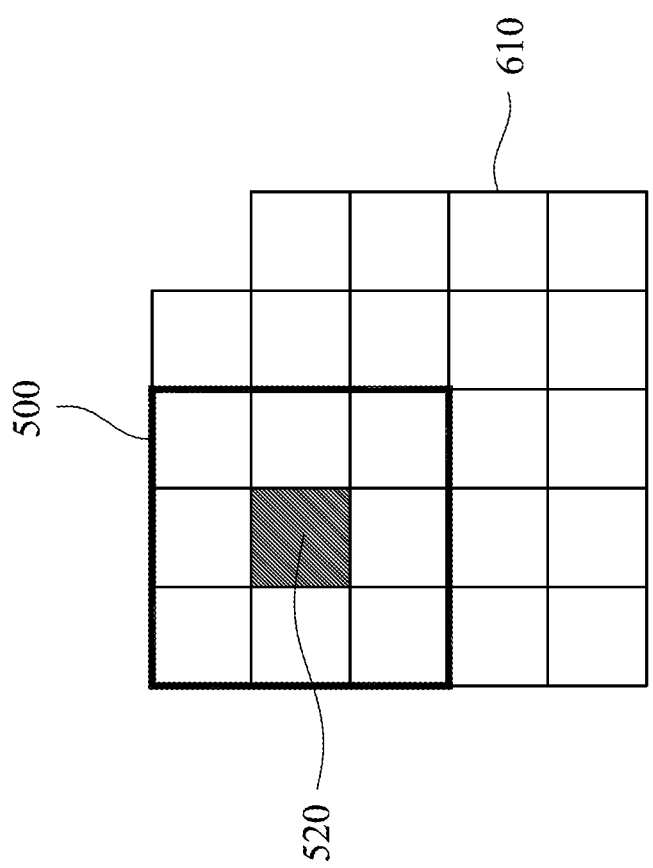
FIG. 8A is a schematic illustration of comparing a mask image with an ROI by superimposing the mask image on the ROI in accordance with some aspects of the present disclosure.

To illustrate how to compare the mask image 500 with the ROI, reference is made to FIG. 8A, which shows how the mask image 500 is compared with the ROI 610 by superimposing the mask image 500 on the ROI 610. The mask image 500 moves in the order from left to right and up to down. While the mask image 500 superimposes on the ROI 610, the pixels of the ROI 610 which are indicated by the retained region 520 are retained, and other pixels of the ROI 610 which are not indicated by the retained region 520 are eliminated. In some embodiments, the pixels which is retained means to set the gray values of the pixels indicated to a white color. The retained portion, as shown in FIG. 8B, the gray values of the pixels of a remaining region 620 are set to the white color. The gray values of the pixels of a periphery 630 are set as a black color (i.e., a first range value). In some embodiments, the first range value is '0' such that the color of a periphery 630 is black. It should be noted that this is a first stage of the filtering process (the eroding pixels stage).

Figure 9A:
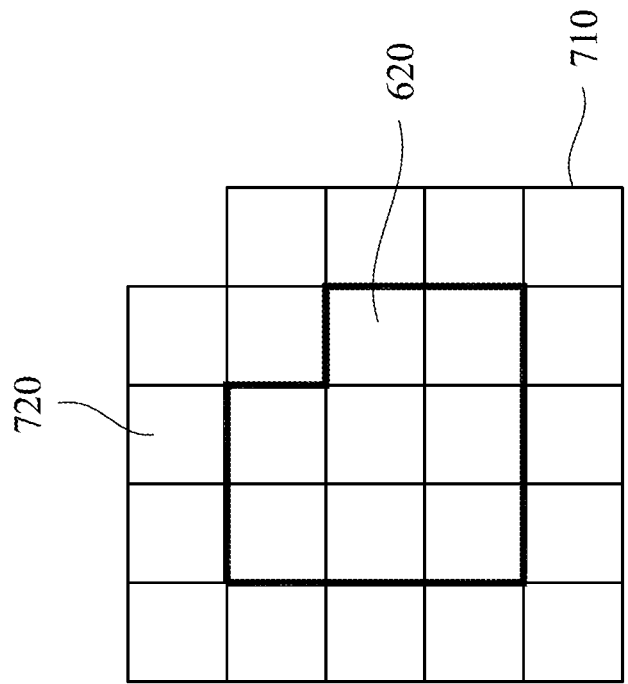
FIG. 9A is a schematic illustration of comparing a retained region of the mask image with a periphery of the remaining region in accordance with some aspects of the present disclosure.
Figure 9B:
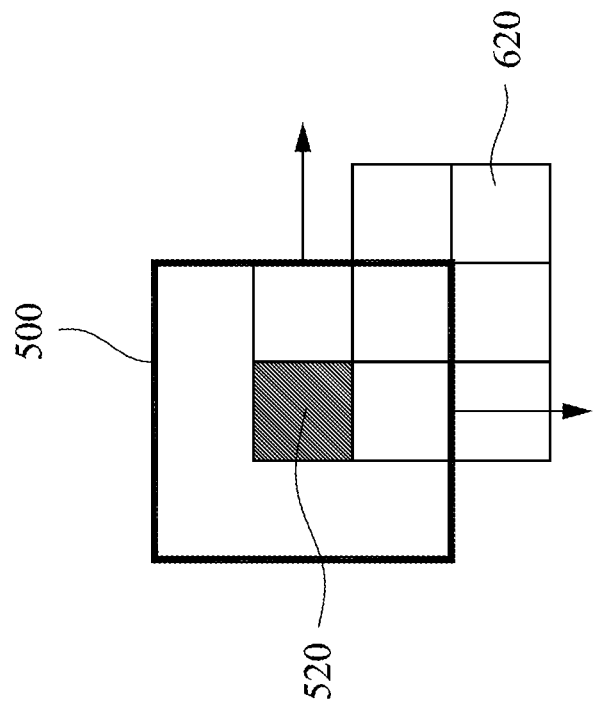
FIG. 9B is an intermediate region after the comparing process in accordance with some aspects of the present disclosure.

In step S420, the remaining region is compared with the mask image, and the gray values of the at least one pixel of the periphery of the remaining region is set, according to the gray values of the pixels indicated in the mask image, to a second range value, in order to obtain an intermediate region. Reference is made to FIG. 9A, which is a schematic illustration of comparing a retained region 520 of the mask image 500 with a periphery of the remaining region 620 in accordance with some aspects of the present disclosure. After the comparing procedure as described above, the gray values of the pixels of the periphery 720 are set to a white color (i.e., a second range value). Reference is made to FIG. 9B, which is the intermediate region 710 after the comparing process in accordance with some aspects of the present disclosure. The intermediate region 710 includes the periphery 720 and the remaining region 620. In some embodiments, the second range value is '255' such that the periphery 720 shows the white color. It should be noted that this is a second stage of the filtering process (the extending pixels stage).

Accordingly, the graphical features of the vertical finger VF in the ROI R1 of FIG. 4B can be eliminated by the steps S410~S420 to obtain the intermediate region R2 of FIG. 4C.

In step S430, the intermediate region is compared with the mask image, and the gray values of the at least one pixel of the periphery of the intermediate region is set, according to the gray values of the pixels indicated in the mask image, to the second range value, in order to obtain a recovering region. Step S430 is similar to the foresaid step S420 and so a description of this step is not repeated herein. It should be noted that this is the first stage of the recovering process (the extending pixels stage).

In step S440, the recovering region is compared with the mask image, and the gray values of the at least one pixel of the periphery of the recovering region is set, according to the gray values of the pixels indicated in the mask image, to the first range value, in order to obtain the pre-processed region. Step S440 is similar to the foresaid step S410 and so a description of this step is not repeated herein. It should be noted that this is the second stage of the recovering process (the eroding pixels stage).

Accordingly, the error region RM of the intermediate region R2 of FIG. 4C can be eliminated by the steps S430~S440 and the graphical features of the busbar BB can be recovered to obtain the pre-processed region R3 shown as FIG. 4D.

Figure 6B:
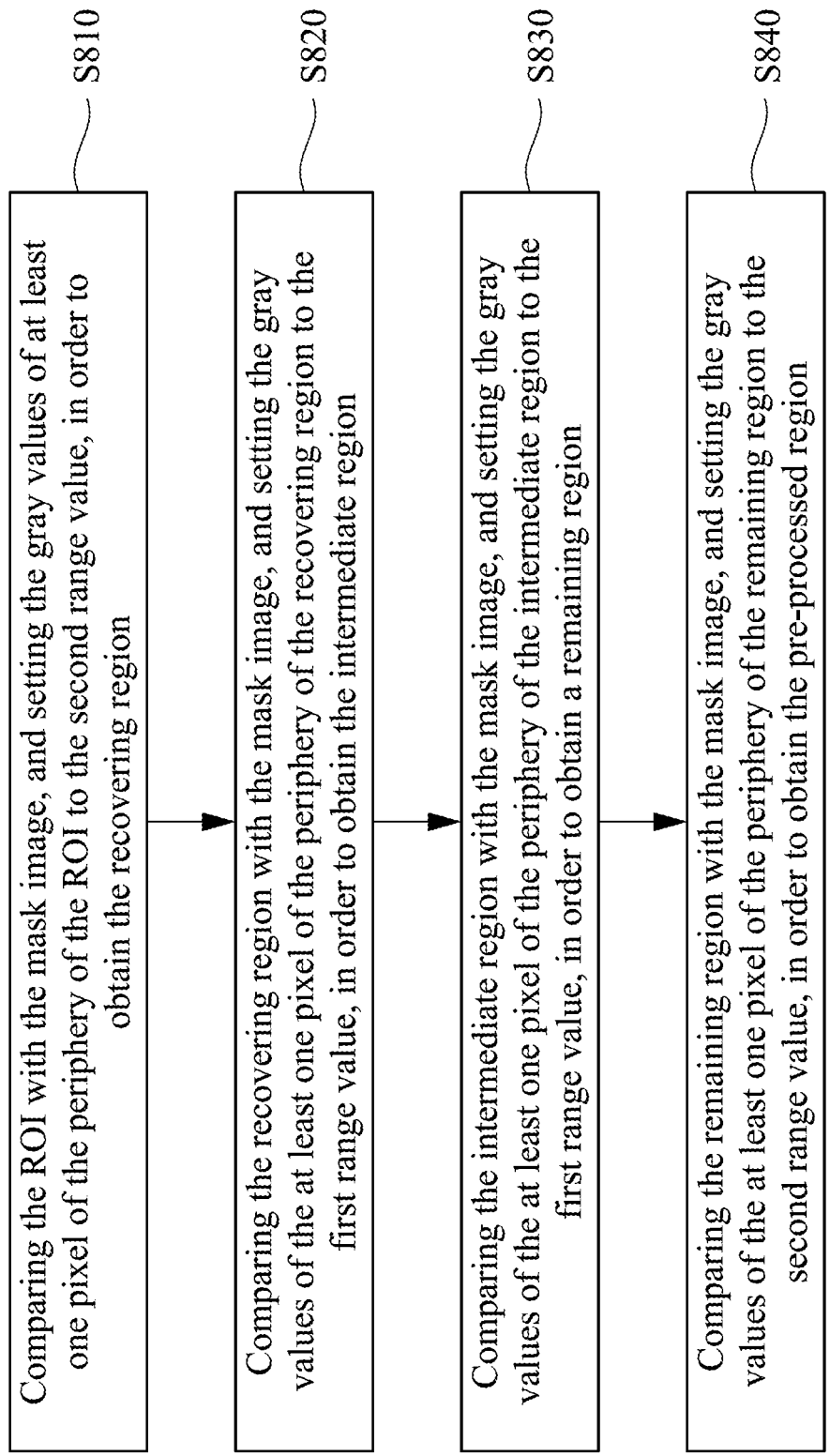
FIG. 6B is a flow chart illustrating another exemplary process for the filtering process and the recovering process in accordance with some aspects of the present disclosure.

Reference is made to FIG. 6B, which is a flow chart illustrating another exemplary process for the filtering process and the recovering process in accordance with some aspects of the present disclosure. As shown in FIG. 6B, steps S810~S820 describe the recovering process, and steps S830~S840 describe the filtering process.

In step S810, the ROI is compared with the mask image, and the gray values of at least one pixel of the periphery of the ROI are set to the second range value in order to obtain the recovering region. The description of step S810 is similar to that of step S430 of FIG. 6A and so will be not repeated herein. It should be noted that this is the first stage of the recovering process (the extending pixels stage).

In step S820, the recovering region is compared with the mask image, and the gray values of the at least one pixel of the periphery of the recovering region are set to a first range value, in order to obtain the intermediate region. The description of step S820 is similar to that of step S440 of FIG. 6A and so will be not repeated herein. It should be noted that this is the second stage of the recovering process (the eroding pixels stage).

Accordingly, the intermediate region R2 of FIG. 5C can be obtained by recovering from the partially disconnected lines of the short finger SF in response to executing steps S810~S820 on the ROI R1 of FIG. 5B.

In step S830, the intermediate region is compared with the mask image 500, and the gray values of the at least one pixel of the periphery of the intermediate region are set to the first range value, in order to obtain the remaining region. The description of step S830 is similar to that of step S410 of FIG. 6A and so will be not repeated herein. It should be noted that this is the first stage of the filtering process (the eroding pixels stage).

In step S840, the remaining region is compared with the mask image 500, and the gray values of the at least one pixel of the periphery of the remaining region are set to the second range value, in order to obtain the pre-processed region. The description of step S840 is similar to that of step S420 of FIG. 6A and so will be not repeated herein. It should be noted that this is the second stage of the filtering process (the extending pixels stage). By these procedures for image processing, the electric wire patterns to be inspected can be filtered from the block images 110, 120, 130, and 140.

Accordingly, the pre-processed region R3 of FIG. 5D can be obtained by eliminating the graphical features of the vertical finger VF of the intermediate region R2 of FIG. 5C in response to executing steps S830~S840 on the intermediate region R2 of FIG. 5C.

As described above, the image inspection method of the present disclosure may involve the processes of executing the filtering process on the block images having different graphical features and then executing the recovering process, or the processes of executing the recovering process and then the filtering process. The specific graphical features intermingling with other types of graphical features are processed first, such that the specific graphical features emerge from all the graphical features. The graphical features which are inspected contain only the graphical features which are desired to be inspected while the graphical features are inspected. Therefore, there exists real defects when some defects are inspected, that is, the result of some defects inspected is not an erroneous determination. Consequently, the accuracy of image inspections is increased and the probability of erroneous determinations is decreased.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. The novel algorithms described herein may also be efficiently implemented in software and/or embedded in hardware.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image inspection method comprising:
   capturing a target object image, wherein the target object image comprises a plurality of graphical features;
   choosing a block image comprising a specific graphical feature of the plurality of graphical features from the target object image;
   capturing all the graphical features of the block image to obtain a region of interest (ROI);
   executing a filtering process or a recovering process on the ROI to obtain a pre-processed region; and
   inspecting, according to the pre-processed region, the target object image to determine whether the target object image has defects;

wherein the step of executing the filtering process on the ROI comprises:
  comparing the ROI with a mask image; and
  setting, according to gray values of pixels indicated in the mask image, the gray values of at least one pixel of a periphery of the ROI to a first range value, in order to obtain a remaining region.

2. The image inspection method of claim 1, wherein the step of obtaining the pre-processed region comprises:
  obtaining an intermediate region in response to selecting and executing the filtering process in the ROI; and
  obtaining the pre-processed region by executing the recovering process on the intermediate region.

3. The image inspection method of claim 1, wherein the step of executing the filtering process on the ROI further comprises:
  comparing the remaining region with the mask image; and
  setting, according to the gray values of the pixels indicated in the mask image, the gray values of the at least one pixel of the periphery of the remaining region to a second range value, in order to obtain the intermediate region.

4. The image inspection method of claim 3, wherein the step of executing the recovering process on the ROI comprises:
  comparing the intermediate region with the mask image; and
  setting, according to the gray values of the pixels indicated in the mask image, the gray values of the at least one pixel of the periphery of the intermediate region to the second range value, in order to obtain a recovering region.

5. The image inspection method of claim 4, wherein the step of executing the recovering process on ROI further comprises:
  comparing the recovering region with the mask image; and
  setting, according to the gray values of the pixels indicated in the mask image, the gray values of the at least one pixel of the periphery of the remaining region to the first range value, in order to obtain the pre-processed region.

6. The image inspection method of claim 1, wherein the step of obtaining the pre-processed region comprises:
  obtaining an intermediate region in response to selecting and executing the recovering process in the ROI; and
  obtaining the pre-processed region by executing the filtering process on the intermediate region.

7. The image inspection method of claim 6, wherein the step of executing the recovering process on the ROI comprises:
  comparing the ROI with a mask image; and
  setting, according to gray values of pixels indicated in the mask image, the gray values of at least one pixel of a periphery of the ROI to a second range value, in order to obtain a recovering region.

8. The image inspection method of claim 7, wherein the step of executing the recovering process on the ROI further comprises:
  comparing the recovering region with the mask image; and
  setting, according to the gray values of the pixels indicated in the mask image, the gray values of the at least one pixel of the periphery of the recovering region to a first range value, in order to obtain the intermediate region.

9. The image inspection method of claim 8, wherein the step of executing the filtering process on the ROI comprises:
  comparing the intermediate region with the mask image; and
  setting, according to the gray values of the pixels indicated in the mask image, the gray values of the at least one pixel of the periphery of the intermediate region to the first range value, in order to obtain a remaining region.

10. The image inspection method of claim 9, wherein the step of executing the filtering process on the ROI further comprises:
  comparing the remaining region with the mask image; and
  setting, according to the gray values of the pixels indicated in the mask image, the gray values of the at least one pixel of the periphery of the remaining region to the second range value, in order to obtain the pre-processed region.

* * * * *